United States Patent
Beatty et al.

(10) Patent No.: US 8,635,187 B2
(45) Date of Patent: Jan. 21, 2014

(54) METHOD AND SYSTEM OF PERFORMING INCREMENTAL SQL SERVER DATABASE BACKUPS

(75) Inventors: Louis J. Beatty, Ormond Beach, FL (US); Michael A. Payne, Archer, FL (US); Steven R. Devos, Kirkland, WA (US); Deepak Saraf, Windermere, FL (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 12/986,666

(22) Filed: Jan. 7, 2011

(65) Prior Publication Data

US 2012/0179655 A1  Jul. 12, 2012

(51) Int. Cl.
*G06F 7/00* (2006.01)
*G06F 17/00* (2006.01)
*G06F 13/00* (2006.01)
*G06F 13/28* (2006.01)
*G06F 15/16* (2006.01)

(52) U.S. Cl.
USPC ............................ 707/646; 707/681; 711/162

(58) Field of Classification Search
USPC .................................. 707/646, 681; 711/162
See application file for complete search history.

(56) References Cited

U.S. PATENT DOCUMENTS

| | | | |
|---|---|---|---|
| 6,085,298 A * | 7/2000 | Ohran ........................... | 711/162 |
| 6,101,585 A | 8/2000 | Brown et al. | |
| 6,249,792 B1 * | 6/2001 | Zwilling et al. .............. | 707/202 |
| 6,460,054 B1 * | 10/2002 | Grummon ..................... | 707/204 |
| 6,665,815 B1 | 12/2003 | Goldstein et al. | |
| 6,829,688 B2 | 12/2004 | Grubbs et al. | |
| 6,847,983 B2 | 1/2005 | Somalwar et al. | |
| 6,880,051 B2 | 4/2005 | Timpanaro-Perrotta | |
| 6,981,177 B2 | 12/2005 | Beattie | |
| 7,310,654 B2 | 12/2007 | McNeil | |
| 7,814,056 B2 * | 10/2010 | McGrattan et al. .......... | 707/646 |
| 8,005,797 B1 * | 8/2011 | Chepel et al. ................. | 707/679 |
| 2004/0268068 A1 | 12/2004 | Curran et al. | |
| 2006/0075294 A1 * | 4/2006 | Ma et al. ........................ | 714/13 |
| 2006/0161802 A1 | 7/2006 | Wang et al. | |
| 2006/0218204 A1 | 9/2006 | Ofer et al. | |

(Continued)

FOREIGN PATENT DOCUMENTS

WO  WO 2004/034197 A2  4/2004

OTHER PUBLICATIONS

European Search Report for Application No. 12150113.4-2224 mailed Jul. 5, 2012.

*Primary Examiner* — Greta Robinson
*Assistant Examiner* — Brian E. Weinrich
(74) *Attorney, Agent, or Firm* — Rory D. Rankin; Meyertons, Hood, Kivlin & Goetzel, P.C.

(57) ABSTRACT

A system, method, and medium for performing incremental backups of a Microsoft SQL server database. A snapshot of the database is created, and then a map identifying the changed extents is retrieved from the snapshot. The changed extents are then retrieved from the snapshot and stored in a backup storage device. For a restore operation, a full database backup file is written to a storage device and then the changed extents from a stored incremental backup file may be merged with the full backup file. Next, the database server is notified of the reconstructed file and then the reconstructed file is mounted by the database server as a live instance of the database.

14 Claims, 9 Drawing Sheets

(56) References Cited

U.S. PATENT DOCUMENTS

| | | |
|---|---|---|
| 2006/0242211 A1 | 10/2006 | Becker et al. |
| 2007/0174325 A1 | 7/2007 | Mooney et al. |
| 2008/0244204 A1 | 10/2008 | Cremelie et al. |
| 2008/0263109 A1 | 10/2008 | Patterson |
| 2010/0005259 A1* | 1/2010 | Prahlad et al. ............... 711/162 |
| 2010/0023716 A1 | 1/2010 | Nemoto et al. |
| 2010/0049930 A1* | 2/2010 | Pershin et al. ............... 711/162 |
| 2010/0058010 A1 | 3/2010 | Augenstein et al. |
| 2010/0077165 A1* | 3/2010 | Lu et al. ...................... 711/162 |
| 2010/0122324 A1 | 5/2010 | Welingkar et al. |
| 2011/0004586 A1* | 1/2011 | Cherryholmes et al. ...... 707/682 |

* cited by examiner

METHOD AND SYSTEM OF PERFORMING INCREMENTAL SQL SERVER DATABASE BACKUPS

BACKGROUND OF THE INVENTION

1. Field of the Invention

The present invention relates generally to database backups, and in particular to a method and system for performing incremental backups of a SQL server database.

2. Description of the Related Art

Database systems, such as a Microsoft® structured query language (SQL) server database system, contain vast amounts of information generated and used by a variety of software applications. Because of the importance of the information stored in databases, a database system provides mechanisms to back up and restore the databases managed by that system. A backup mechanism may create a complete copy of the database, and the restore mechanism may overwrite the database with the copy. A database system may also be capable of playing back transactions to restore a database. Such a database system may log all transactions and use those transactions to restore a database to a particular state by starting at a known prior state and applying transactions that occurred after that state.

A database system may also provide a snapshot mechanism that allows the state of a database to be preserved in a "snapshot." Typically, taking a snapshot is a precursor to performing a full backup. Performing a snapshot is a way to minimize the disruption to the SQL server, as compared to performing a streaming backup. Microsoft SQL server supports snapshot backup and restore technologies. A snapshot backup is a specialized backup that is created almost instantaneously. A snapshot may be created by various well-known techniques, including copy-only backup, split-mirror, specialized hardware that creates a copy of a storage device, and other methods. Snapshot backups may minimize or eliminate the use of the resources of the SQL server to accomplish the backup. This may allow the availability of the SQL server to be minimally impacted by performing a backup operation.

Database systems utilize snapshots for a variety of reasons. One typical use of snapshots is to copy a database without disabling access to the database for a long period of time. After performing the snapshot, the database system can then copy the database by leveraging the snapshot of the database. Thus, the database system performs a full backup of the primary database when the primary database is active. In general, a snapshot records the state of the database at a certain point in time. That is, the snapshot may be used to provide a point-in-time image of a live database. Additional operations can then be performed using the snapshot copy without affecting the performance of the live database.

Another goal, besides reducing the downtime of an active SQL server database, is to reduce backup storage utilization. To achieve this goal, differential backups are often performed instead of full backups. Performing differential backups takes advantage of a common characteristic of SQL server databases—typically, only a small percentage of the data in the database changes in between consecutive backups. With only part of the data actually changing between backups, it increases the efficiency of the backups to perform a differential backup instead of a full backup. The time necessary to complete the backup may be reduced, limiting the downtime of the database, and the amount of data stored in the backup may also be reduced, decreasing the amount of storage required to store the backup.

SQL server maintains a bitmap with information on which extents have changed since the last full backup. This bitmap is called the differential change map (DCM), and SQL server uses the DCM to perform differential backups. The DCM tracks the extents that have changed since the last full database backup. Extents are a collection of eight physically contiguous pages and may be used to efficiently manage pages. The DCM is a bitmap where each bit represents a single extent. The bitmap is organized such that if the bit for an extent is 1, then the extent has been modified since the last full backup and if the bit for an extent is 0, then the extent has not been modified.

SQL server also maintains allocation maps to record the allocation of extents to objects in the database. One of the allocation maps is the index allocation map (IAM). The IAM contains information about the extents that a table or index uses. Another of the allocation maps is the global allocation map (GAM). The GAM contains information about which extents have been allocated. Another of the allocation maps is the shared global allocation map (SGAM). The SGAM tracks mixed extents that have at least one unused page. There is also a way to track free space, called the page free space (PFS) pages. The PFS pages record the allocation status of each page, such as whether an individual page has been allocated and the amount of free space on each page.

A common technique used for administering a SQL database is to preallocate extra space to the database to give it room to expand. When a database file is mounted by a SQL server, and when the size of the database file needs to increase beyond the size allocated to it to accommodate new transactions, it is a time-consuming process to increase the size of the database. Therefore, it is customary for the size of the SQL database to be much larger than the amount of data it currently stores. However, when performing a full backup, all of the space allotted to the database, even if it is not being used, will be backed up, thus increasing the size of backups. Also, if a table or other object has been deleted from the database, a full backup will still back up all the space that the deleted table or object took up.

Differential backups may be used by SQL server to reduce the size of the backups, but differential backups have some drawbacks. For example, a differential backup must be restored to a live instance of the database, which will result in downtime of the database. SQL server also support log backups to backup a list of transactions that have occurred; like differential backups, log backups need to be played back to a live instance of the database during restoration. It would be preferable to prepare a full copy of a point-in-time database file for restoration without requiring any assistance from the SQL server.

Another way to reduce the size of database backups, other than performing differential or log backups, is to perform incremental backups. However, SQL server currently does not support incremental backups of the database. Therefore, what is needed is a way to perform an incremental backup making use of the snapshot and data tracking mechanisms maintained by SQL server, while also preserving the ability to do a fast, efficient restoration from the incremental backup.

In view of the above, methods and mechanisms for performing incremental backups of a SQL database are desired.

SUMMARY OF THE INVENTION

Various embodiments of methods and mechanisms for performing incremental backups of a SQL server database are contemplated. In one embodiment, a full backup of the database may be performed. After the full backup, subsequent backups may be incremental backups. To perform an incremental backup, first a request to perform a full backup of the database may be conveyed to the SQL server. The SQL server may behave as though a full backup of the database is being performed, even though an incremental backup may actually be performed. Next, a snapshot of the database may be taken. One or more maps may be retrieved from the snapshot. The one or more maps may include information identifying the extents that have changed since a prior full backup, prior snapshot, or prior incremental backup. After identifying the changed extents, the changed extents may be retrieved from the snapshot and stored as an incremental backup file in a backup storage device. Then, the snapshot may be discarded. At some point after the snapshot of the database is taken, the SQL server may reset the live copy of the DCM bitmap as though a full backup operation were performed.

In another embodiment, after identifying the changed extents, one or more allocation maps may be retrieved and read to determine if each of the changed extents is allocated to a table or other object. If a changed extent is not allocated, then the changed extent will not be stored as part of the incremental backup. One or more maps may also be stored as part of the incremental backup. The method further comprises repeating the above described steps for a plurality of incremental backups and snapshots.

In a further embodiment, previously stored full backup may be converted to a partial backup such as an incremental backup or a differential backup. In one embodiment, a stored snapshot of the database may be retrieved from a storage device. The stored snapshot may correspond to a previous full backup operation performed on the database. The stored full backup may be converted into an incremental backup file to reduce the storage utilization for that particular backup. To convert the stored snapshot into an incremental backup file, one or more maps identifying changed extents may be retrieved from the snapshot. Alternatively, the one or more maps identifying changed extents may be stored separately from the snapshot. Then, the changed extents may be retrieved from the stored snapshot and stored as an incremental backup file in a backup storage device. The unchanged data from the backup may be discarded. Alternatively, other similar techniques may be used to convert a stored full backup file into an incremental backup file.

In another embodiment, a restore operation may be requested following one or more incremental backups. A media server may retrieve a prior full backup file from a backup storage device and write the prior full backup file to a storage device, such as a disk or other storage device associated with the media server or the SQL server. The media server may perform this step without requiring any input from the SQL server. This may allow the SQL server to continue performing operations as part of the normal functionality of the database, such as processing new transactions. Next, the media server may retrieve one or more incremental backup files and write the changed extents from the incremental backup files to the appropriate locations within the full backup file. The media server may write changed extents to the full backup file from a plurality of incremental backup files; the plurality of incremental backup files may correspond to a plurality of incremental backups that were performed following the full backup operation. The media server may also write changed extents from the incremental backup files in the order they were created, such that changed extents from the oldest incremental backup file are written first, and changed extents from the newest incremental backup file are written last. The media server may determine where the changed extents belong in the unmounted full backup file by reading the one or more maps that were stored as part of the incremental backup operation. The media server may write the changed extents back within the unmounted full backup file without requiring any input from the SQL server.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
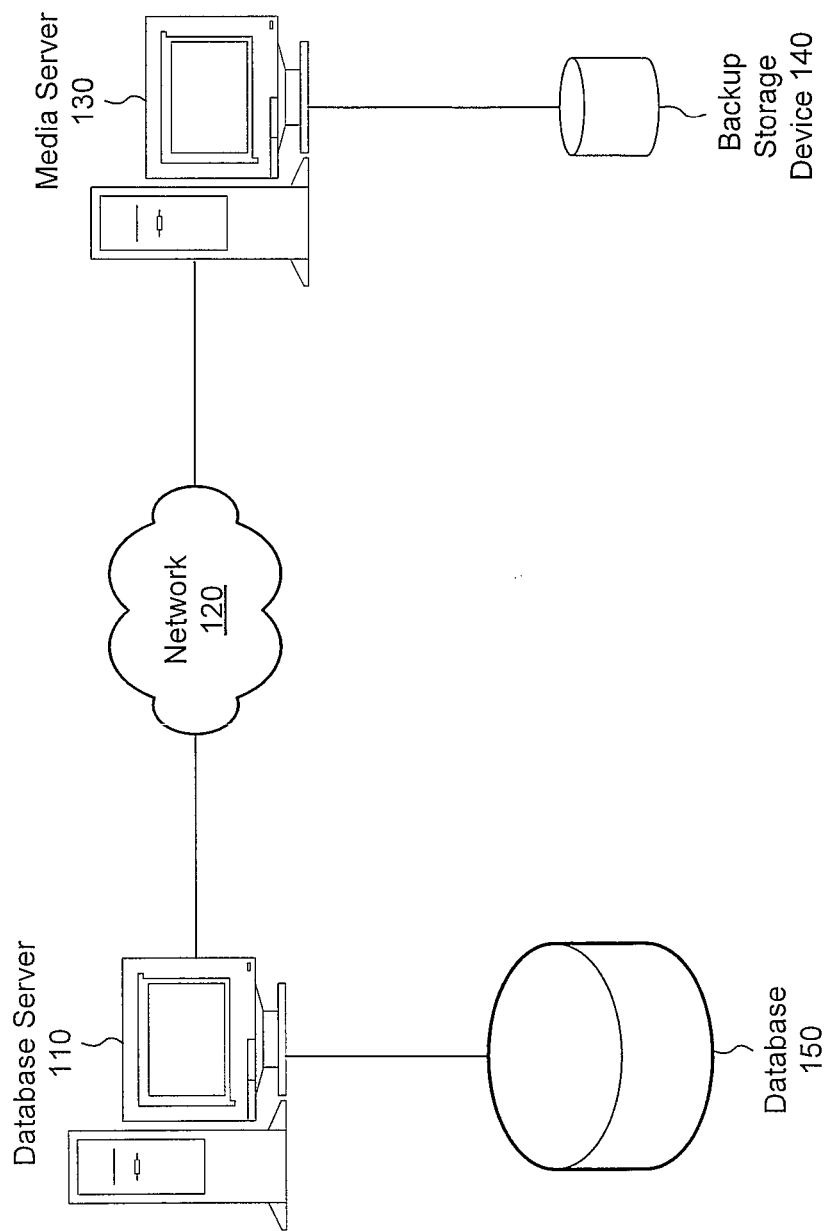
FIG. 1 is a diagram that illustrates a database archival system in accordance with one or more embodiments.

Referring to FIG. 1, a generalized block diagram of one embodiment of a database archival system is shown. Database server 110 and media server 130 are connected to network 120. In one embodiment, database server 110 may be a Microsoft SQL Server. In some embodiments, database server 110 may also be connected to an applications server (not shown), such as a Microsoft® SharePoint® server.

Network 120 may comprise a variety of network connections including combinations of local area networks (LANs), such as Ethernet networks and Fibre Channel (FC) networks, and wireless local area networks (WLANs) based on the Institute of Electrical and Electronics Engineers (IEEE) 802.11 standards (Wi-Fi), and wide area networks (WANs), such as the Internet, cellular data networks, and other data communication networks such as a virtual private network (VPN) implemented over a public network (e.g., the Internet). Other network connections and architectures are possible and contemplated.

Media server 130 may manage backup storage device 140, and media server 130 may store backup data and metadata received from database server 110 in backup storage device 140. Media server 130 may host software to perform tasks associated with backing up and restoring data to database server 110. Media server 130 is representative of any number of media servers, master servers, or other types of servers which may be connected to network 120. In other embodiments, media server 130 may be a master server, other type of server, or some combination of one or more servers in a database archival system.

Media server 130 may be directly connected to backup storage device 140 or media server 130 may be connected to backup storage device 140 over any of a variety of networks, such as a LAN, storage area network (SAN), or other network. In one embodiment, backup storage device 140 may be an adapter card directly attached to a bus of media server 130. Media server 130 may use internal memory (e.g., random-access memory (RAM)) for buffering data when receiving and sending data to and from database server 110, backup storage device 140, or other devices. Backup storage device 140 is representative of any number of backup storage devices, and may comprise any of a variety of types of storage media, such as a hard disk drive, disk volume, server blade, flash drive, optical drive, tape drive, tape volume, robotic tape library, or other storage medium.

Database 150 may represent both a database program and/or one or more actual databases implemented therein. The database program refers to the executable commands, user interfaces and other program code for operating the database. The included databases may further comprise various tables, indexes, relationships, queries, stored procedures, file systems, security layers, networking interfaces, etc., which are configured to operate on a plurality of data records.

The records in database 150 may be arranged in tables (row and column arrangement). The term "record" as used herein shall refer to an entry in a database. A collection of associated records may be collectively described as a "table" in the database. A record may consist of one or more fields, which may serve as indexes (or keys) to other records in other tables. For example, in a document management database, each record in a document table may represent a document stored in the database. In one embodiment, the document may be stored in the fields of the record itself. In some embodiments, the document may be represented in a record by a reference to the document, such as a memory location. In addition, the database may create and modify a mounted database file for storing and accessing any given implementation of a relational database. In some embodiments, database 150 may execute on a dedicated computing system, such as database server 110, that is configured for access by other server and client computers via network 120.

Database 150 may include various kinds of functions associated with a relational database, such as add and query procedures. The query function may retrieve information from the database, such as a change map, allocation maps, objects, tables, records, and other data. The add function may store information in the database. Databases 150 may be a Microsoft SQL Server database and the interface used to provide access to database 150 may use SQL. Data may be stored and retrieved from database 150 at a page level. Each page may have a size of 8 kilobytes (KB) and may consist of a header and data. The page header may contain an object ID to which the data in the page belongs. Server input/output (I/O) operations may be performed at the page level, such that database server 110 reads or writes whole pages.

After a full backup process wherein a full backup of database 150 is generated, a subsequent incremental backup process may be employed to generate an incremental backup and capture only the extents that have changed since the most recent full backup. The generation of incremental backups may continue indefinitely, wherein a continuous number of subsequent incremental backups may be performed and created, wherein each incremental backup includes extents that have changed after the most recently performed incremental backup. The changed extents from the plurality of incremental backup operations may be stored in backup storage device 140.

For a restore operation, the most recently generated full backup may be restored in a process of writing the database file to a storage device, such as backup storage device 140, physical memory of database server 110, or other storage device. The changed extents stored in the first incremental backup file may then be distributed to the appropriate memory locations within the database file to re-instantiate the database file to the state that database 150 was at the time that the first incremental backup was initiated. This process may then be successively iterated for each of the incremental backups in an order in which the series of incremental backups were generated. At the end of the process, database server 110 may be notified that the database file has been reconstructed and is ready to be restored as a live instance of database 150.

Instead of restoring the entire database, a user or administrator may wish to restore one or more data items (e.g. files, emails, images) from the backed up database. Database server 110 may retrieve the one or more requested data items from the recovered database file and restore the items to database 150. The process of restoring one or more data items may be referred to as a granular restore process.

Media server 130 and database server 110 of FIG. 1 may be any type of computing device (e.g., server, desktop personal computer (PC), laptop, smartphone) and comprise various hardware and software components. The hardware components may include one or more processors, memory devices, and input/output (I/O) devices, connected together via a bus architecture. The software components may include an operating system stored in a memory device. The operating system may be any of various types of operating systems, such as Microsoft Windows®, Linux®, Solaris®, or others. The operating system may be operable to provide various services to the user and may support the execution of various programs such as backup applications, server applications, database applications, software agents, or any of a variety of other applications.

In other embodiments, the number and type of database servers, databases, media servers, networks, and backup storage devices is not limited to those shown in FIG. 1. Any number and combination of media servers, database servers, and databases may be interconnected in network architectures via various combinations of modem banks, direct LAN connections, wireless connections, WAN links, etc.

Figure 2:
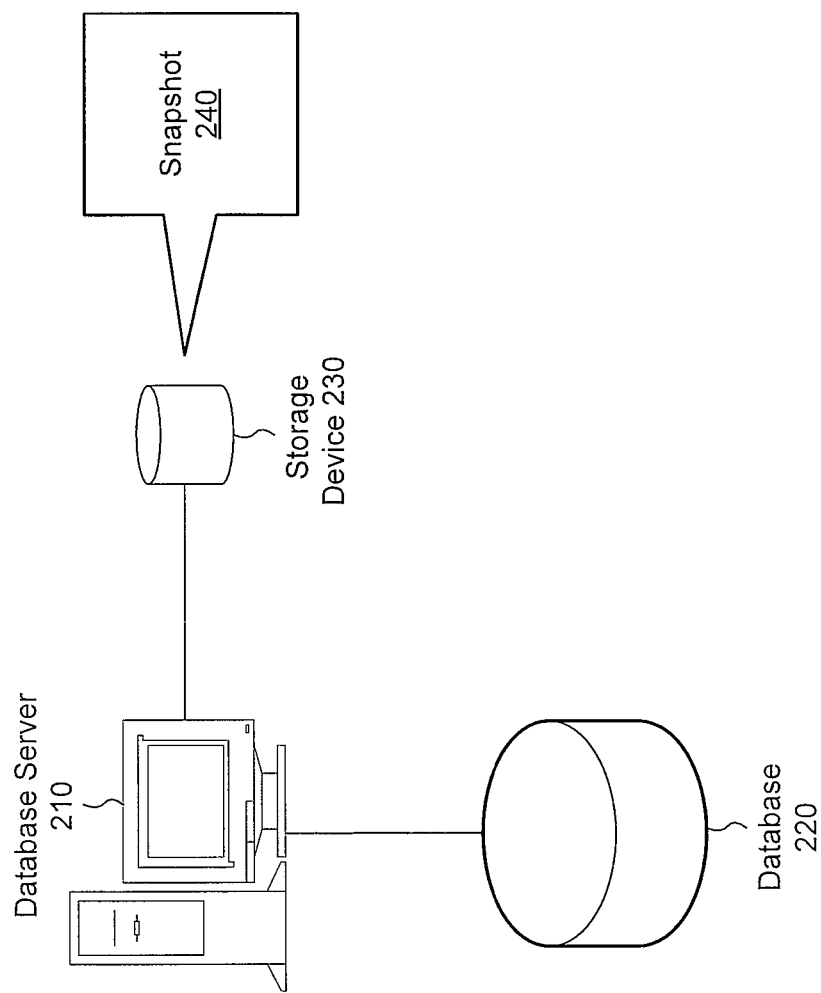
FIG. 2 illustrates a database server creating a snapshot.

Referring now to FIG. 2, an illustration of a database server creating a snapshot image is shown. Database server 210 manages database 220, and database server 210 may be connected to storage device 230. Storage device 230 is representative of any number of storage devices, and storage device 230 may be any of the types of storage media previously described. Alternatively, database server 210 may use physical memory or other local storage to store snapshot 240 and other data related to database 220.

As shown in FIG. 2, snapshot 240 is stored in storage device 230. Snapshot 240 may be created by database server 210, and snapshot 240 may represent a backup image of database 220. Snapshot 240 may be a static, point-in-time representation of database 220. Snapshot 240 may be a copy of a full image of the entire database, and database server 210 may store snapshot 240 in storage device 230 after performing the snapshot backup. A media server (not shown) may access snapshot 240 to perform an incremental backup. Alternatively, a media server may access snapshot 240 to perform a full backup. Database server 210 may consider a snapshot backup as a full backup, and database server 210 may reset maps and other metadata to indicate that the snapshot backup was the equivalent of a full backup.

Figure 3:
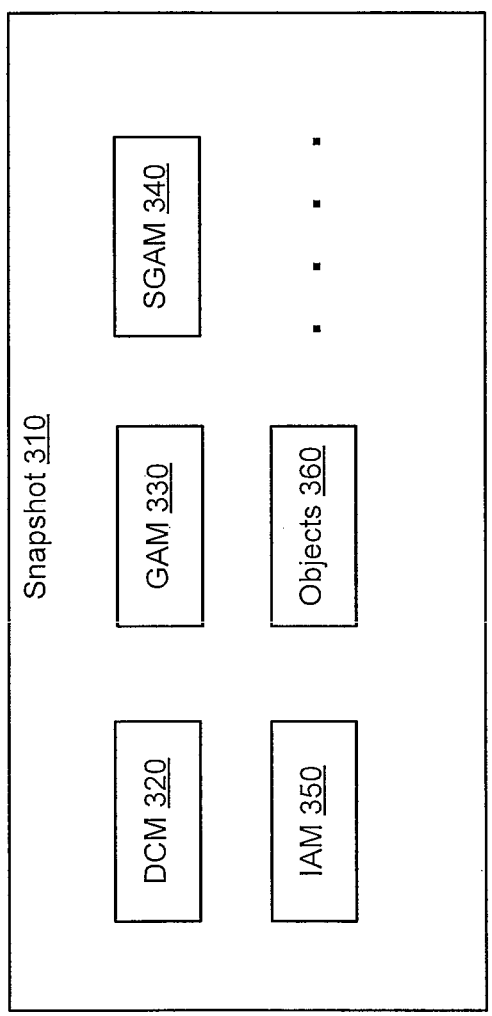
FIG. 3 illustrates a snapshot image in accordance with one or more embodiments.

Referring now to FIG. 3, one embodiment of a snapshot image is shown. Snapshot 310 represents an image taken from a SQL database during a snapshot backup by a SQL server. Snapshot 310 may contain all of the data from the database, including metadata and one or more maps. The maps may include differential change map (DCM) 320, global allocation map (GAM) 330, shared global allocation map (SGAM) 340, index allocation map (IAM) 350, and objects 360. Objects 360 are representative of any number of objects which may exist in the underlying SQL database from which snapshot 310 was created. Objects 360 may be organized into extents, and objects 360 may be representative of any type of data stored in a database, including tables, records, documents, items, lists, and other data. In some embodiments, the SQL database may consist of one or more files, each with its own set of maps. In those embodiments, snapshot 310 may contain multiple DCM's, GAM's, SGAM's, IAM's, etc.

A media server may retrieve DCM 320 from snapshot 310. Then, the media server may read the pages of DCM 320 to determine which extents have been modified since a previous full or incremental backup. The media server may execute a query to retrieve the pages that make up the DCM from snapshot 310. The first DCM page may be located at the $7^{th}$ page of snapshot 310. The second DCM page may be located 512232 pages offset from the first DCM page, at the $512239^{th}$ page. The third page DCM page may be offset 1024464 pages from the first DCM page, at the 1022471th page, and so on.

The media server may also execute a query to retrieve one or more allocation maps from snapshot 310. The allocation maps may contain information about the extents that an object or index uses. For example, the allocation maps may contain bitmasks of extents indicating which extents are in use for that object. The one or more allocation maps may include GAM 330, SGAM 340, and IAM 350. These allocation maps may allow the media server to determine if the changed extents have been allocated. For example, an extent may have changed because its corresponding object was deleted. Therefore, the extent may not actually contain any data that needs to be backed up, even though DCM 320 may indicate that the extent has changed. By checking the allocation maps, the media server may reduce the number of extents that need to be stored as part of the incremental backup.

The media server may retrieve from snapshot 310 only the changed extents which have been allocated to an object. Then, the media server may store the retrieved extents in a storage device. The media server may also store metadata including one or more maps as part of the incremental backup. Alternatively, the media server could backup snapshot 310 in its entirety as part of a full backup. However, performing a full backup of snapshot 310 may take up a much larger amount of storage space than performing an incremental backup. After the changed extents and one or more maps are retrieved from snapshot 310 and stored in a backup storage device, snapshot 310 may be discarded. The above steps regarding snapshot 310 described as being performed by a media server may also be performed by a database server, other server, or other type of computing device.

Figure 4:
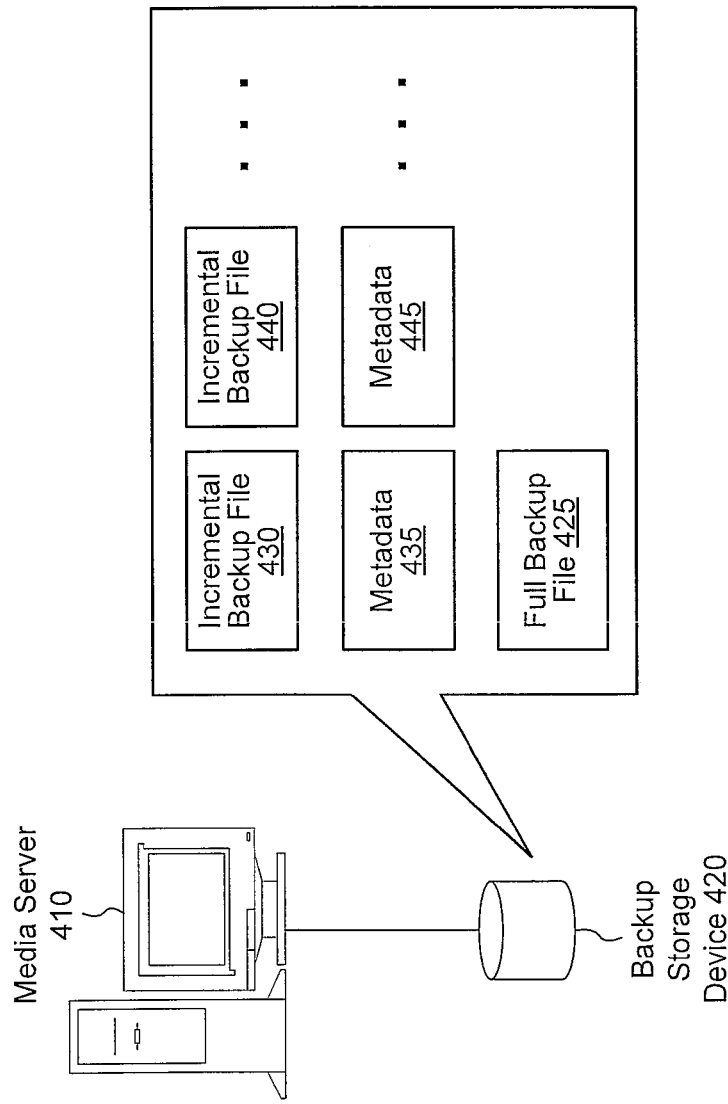
FIG. 4 illustrates a media server and a storage device with stored database backup files in accordance with one or more embodiments.

Referring now to FIG. 4, one embodiment of a media server and a backup storage device with stored database backup files is shown. Media server 410 may store files associated with backups of a database in backup storage device 420. Full backup file 425 is stored in backup storage device 420, and full backup file 425 may contain data from a prior full database backup operation. In one embodiment, full backup file 425 may be a master data file (MDF). Media server 410 may also be configured to generate and store a schema of table and index information along with the backed up contents in the full backup file 425. The schema may refer to the data structure of a database file, and the schema may include memory locations that define certain data structures within the database file. The schema may be used to quickly and efficiently locate objects in full backup file 425, without having to perform extensive searching operations. The schema may be generated by querying a database when a full backup of the database is being created. The schema may be used to access or restore the contents of full backup file 425 without using the live database or the database server.

Incremental backup files 430 and 440 are also stored in backup storage device 420. Incremental backup files 430 and 440 may also be referred to as block level incremental files. Incremental backup files 430 and 440 contain the changed extents that are backed up as part of incremental backup operations of a database. Incremental backup files 430 and 440 are representative of any number of files associated with any number of incremental backup operations that may be performed. For example, if ten incremental backups are performed on a database connected to media server 410, then there may be ten incremental backup files stored in backup storage device 420.

In one embodiment, full backup file 425 and/or incremental backup files 430 and 440 may be binary files that are sequentially accessed, using standard file I/O calls to the file system of backup storage device 420. The file system may be an information system which references and stores data, hierarchically organized in files and directories, in a volume created on backup storage device 420. In some embodiments, full backup file 425 and/or incremental backup files 430 and 440 may be structured in block units of memory, also referred to as pages or allocation units.

Metadata 435 and 445 are also stored in backup storage device 420, and metadata 435 corresponds to incremental backup file 430 and metadata 445 corresponds to incremental backup file 440. Metadata 435 includes additional data, such as one or more maps, that may be stored in backup storage device 420 as part of the incremental backup operation associated with incremental backup file 430. The one or more maps may include a DCM, GAM, SGAM, IAM, and other maps. Additional information may also be stored in metadata 435 relating to incremental backup file 430. Metadata 435 may be used to facilitate restore operations for one or more data items from incremental backup file 430. In another embodiment, there may be one metadata store in backup storage device 420 containing metadata associated with multiple incremental backup operations. In a further embodiment, metadata 435 may be stored within incremental backup file 430. The above described features of metadata 435 may also apply to metadata 445.

In one embodiment, when a new full database backup operation is performed, media server 410 may delete the old full database backup file from backup storage device 420.

Media server 410 may also delete the old metadata and incremental backup files at that time. In another embodiment, media server 410 may retain one or more prior full database backup files, incremental backup files, and/or metadata files when a new full database backup operation is performed. Media server 410 may have a retention policy regarding metadata files, incremental backup files, and full database backup files that involves deleting older files to free up storage space in backup storage device 420.

In another embodiment, full backup file 425 may be converted into an incremental backup file (or a differential backup file) to reduce the storage utilization associated with full backup file 425. If full backup file 425 corresponds to a snapshot backup, then one or more maps that identify data which has changed as compared to an earlier backup may be retrieved from full backup file 425. Alternatively, the maps identifying the changed data (which may be identified as extents) may be stored separately from full backup file 425, and the maps may be retrieved from this separate file or location. After the maps have been retrieved and the changed data has been identified, the changed data may be retrieved from full backup file 425 and stored as an incremental backup file in backup storage device 420. Alternatively, a different algorithm may be used to convert full backup file 425 into an incremental backup file. After full backup file 425 has been converted into an incremental backup file, full backup file 425 may be discarded from backup storage device 420. An identification of the earlier backup to which the newly created incremental backup corresponds may also be stored.

For full backup file 425 to be compressed into a converted incremental backup file, a previous full backup file that was created prior to full backup file 425 may need to be stored in backup storage device 420. The previous full backup file may be referenced by (or otherwise associated with) the converted incremental backup file to facilitate any potential restore operations. A future restore operation may then utilize both the previous full backup file and the converted incremental backup file.

Figure 5:
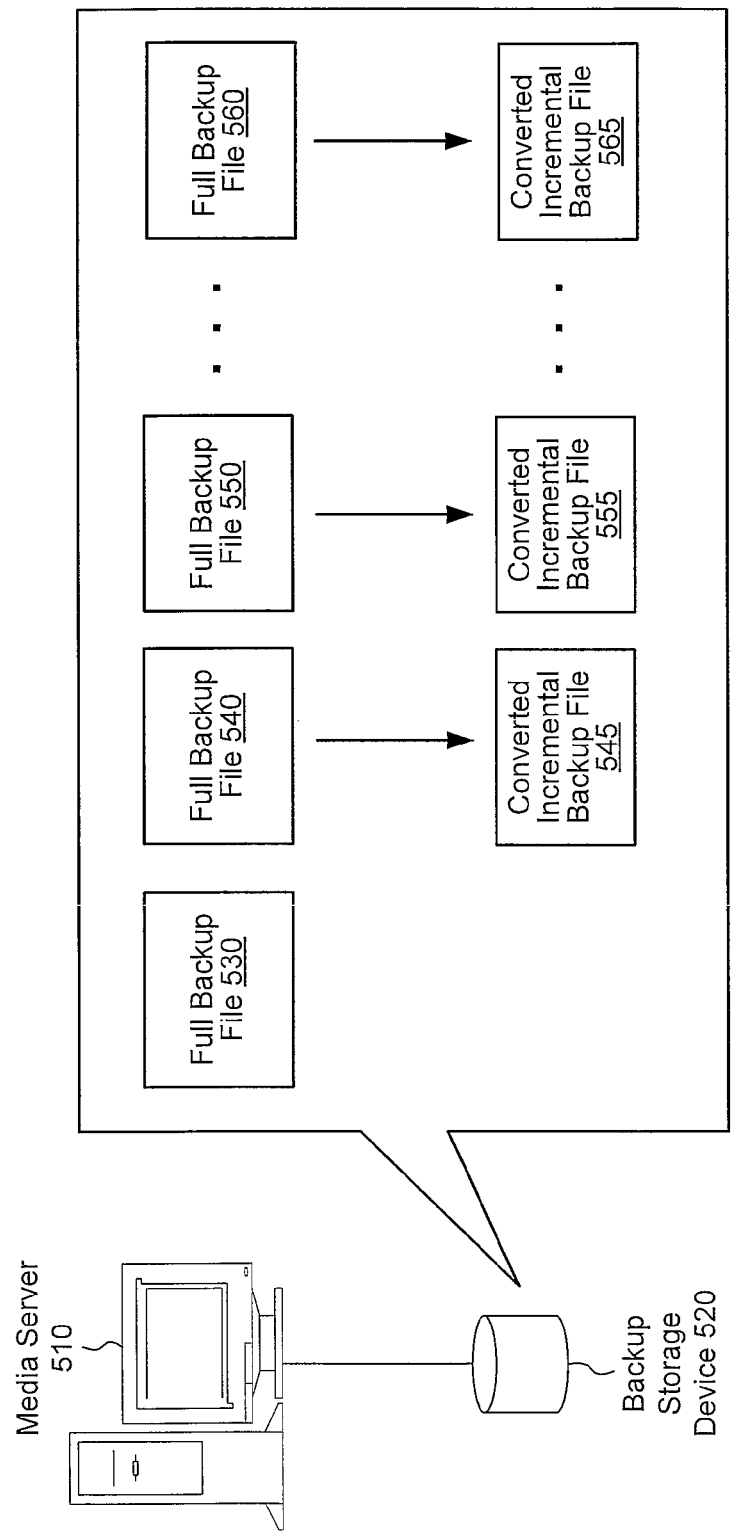
FIG. 5 illustrates one embodiment of stored full backup files being converted into incremental backup files.

Referring now to FIG. 5, an illustration of system and method for compressing previously stored full backup files is shown. In the example, stored full backup files are converted into partial (e.g., incremental) backup files. Media server 510 is connected to backup storage device 520, and backup storage device 520 stores full backup files 530, 540, 550, and 560. Full backup files 530-560 are representative of any number of full backup files which may be stored in backup storage device 520.

Full backup files 530-560 may correspond to full backup operations that were performed earlier (e.g., consecutively) without any incremental or differential backup operations performed in between the full backup operations. The storage space used to store full backup files 530-560 may be reduced by compressing one or more of full backup files 530-560 into converted incremental backup files.

When converting previously created full backup files to partial backup files, an earlier stored full backup file may be used as an anchor, or starting point/reference, for the later full backup files which are to be converted. In the example shown in FIG. 5, full backup file 530 may be used as the anchor full backup file. The next stored full backup file following the anchor file (i.e., full backup file 540) may be compressed into a converted incremental backup file by reading one or more maps that identify the changed data, retrieving the changed data from full backup file 540, and storing the changed data as an incremental backup file (i.e., converted incremental backup file 545). After converted incremental backup file 545 has been created, full backup file 540 may be discarded. In other embodiments, different methods may be used to convert a full backup file into an incremental backup file. This process may continue by compressing full backup files 550 and 560 into converted incremental backup files 555 and 565, respectively. Then, full backup files 550 and 560 may be discarded. This process may result in a significant reduction in storage utilization for the stored backup files. The anchor full backup file (i.e., full backup file 530) and converted incremental backup files 545-565 may be moved to a cloud-based storage location, tape device, or left on backup storage device 520. A full or granular restore may be performed using full backup file 530 and one or more of converted incremental backup files 545-565.

Figure 6:
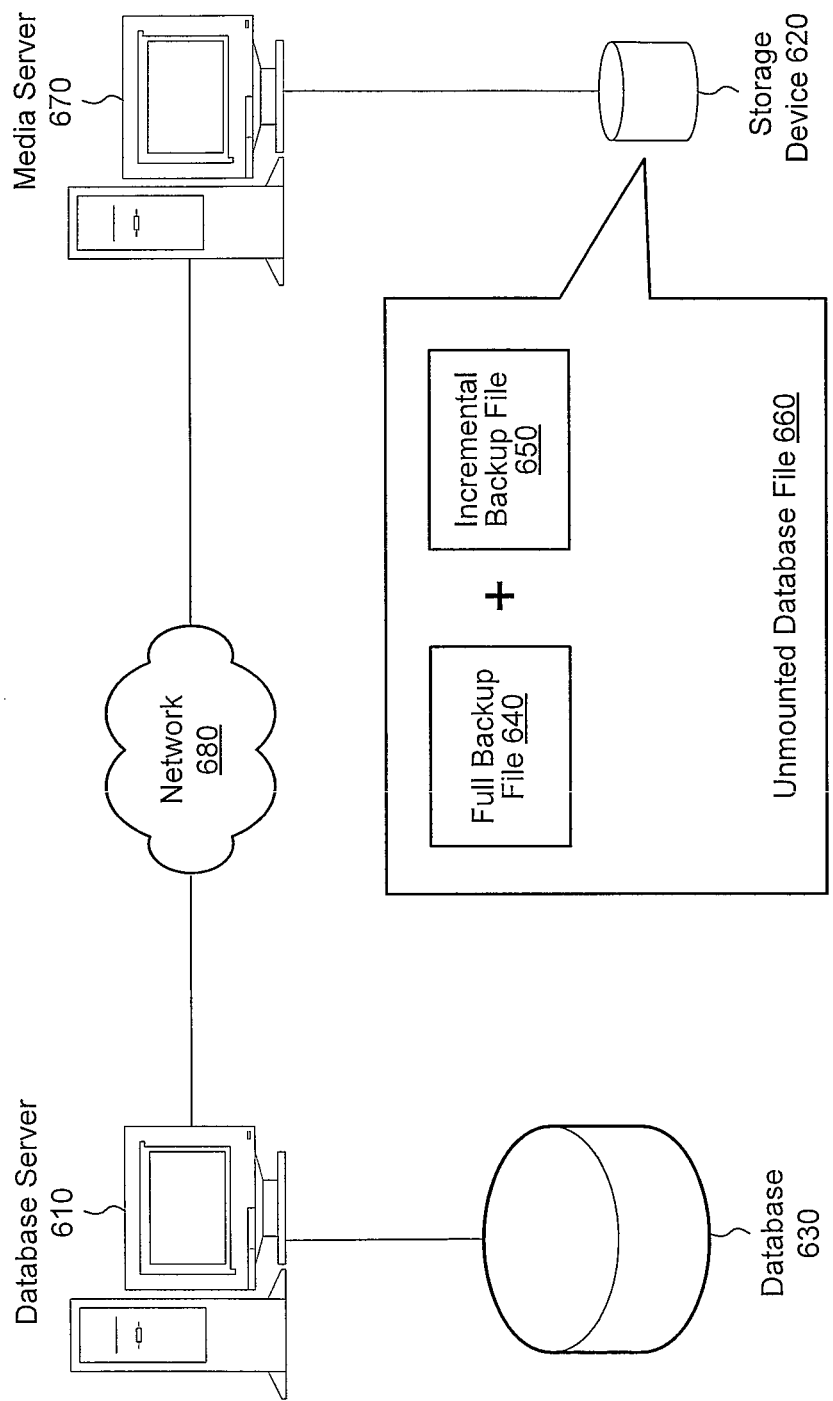
FIG. 6 illustrates one embodiment of a database archival system.

Turning now to FIG. 6, one embodiment of a database archival system is shown. Database server 610 is connected to network 680 and database 630. Media server 670 is connected to network 680 and storage device 620. In another embodiment, storage device 620 may be directly connected to database server 610, and media server 670 may access storage device 620 over network 680. A user or administrator may request to restore the database to a specific point-in-time associated with a specific incremental backup. Alternatively, a user or administrator may request to restore one or more data items from a specific point-in-time. Media server 670 may store backups of database 630, and media server 670 may merge a full backup file with one or more incremental backup files as part of a restore operation of one or more data items.

Unmounted database file 660 contains full backup file 640 and incremental backup file 650. The term "unmounted database file" as used herein is meant to include a database that contains data for a content management application that is not currently activated on a live instance of the content management application. Full backup file 640 may correspond to the most recent full backup of database 630 that was performed prior to the point-in-time selected by the user. Full backup file 640 may contain all of the data from database 630 at the time the full backup operation was performed. Incremental backup file 650 may correspond to an incremental backup that occurred at the selected point-in-time. Incremental backup file 650 is representative of any number of incremental backups that may have been performed subsequent to the full backup operation corresponding to full backup file 640 and prior to the selected point-in-time.

Database server 610 may include a granular restore function to add specific objects or records from unmounted database file 660 to database 630. The granular restore function may also include a means for selecting one or more records or objects for restoration. In one embodiment, a user interface for selecting and restoring records or objects may be provided as part of a granular restore operation. Granular recovery may enable administrators or users to select only the records or objects needed from unmounted database file 660 without having to recover the entire file. In some embodiments, objects may be documents such as Microsoft Word®, Excel®, PowerPoint®, portable document format (PDF), video, audio files, and others. In other embodiments, objects may include sites, sub-sites, lists, and list items.

In one embodiment, objects may be restored from unmounted database file 660 to the working copy of database 630, or to another copy of database 630. In another embodiment, objects may be buffered in memory in database server 610 before being restored to the working copy of database 630. In a further embodiment, objects may be restored from unmounted database file 660 to a file system on a storage medium, database server 610, media server 670, other server, client, or other computing device. In a still further embodiment, objects may be restored to an internal portal application or other software application.

A user may perform differential and log backups as well as full and incremental backups. The differential and log backups may be intermixed with the full and incremental backups. The methods and mechanisms described herein may also be used to perform incremental backups and to restore the database to incremental backups, while also performing differential and log backups and restoring from differential and log backups. For example, a user may perform a full backup, an incremental backup, two differential backups, and then a log backup. A user may then wish to restore the database to its state as it existed following the log backup. The full backup file may be written to a storage device, and then the incremental backup file may be superimposed (i.e., logically merged) on the full backup file. Then the second differential backup file may be restored on top of the full plus incremental file. Finally, the log backup may be played back on the recovered database file. Other sequences of full, incremental, differential, and log backups may be performed in accordance with the methods and mechanisms described herein.

Figure 7:
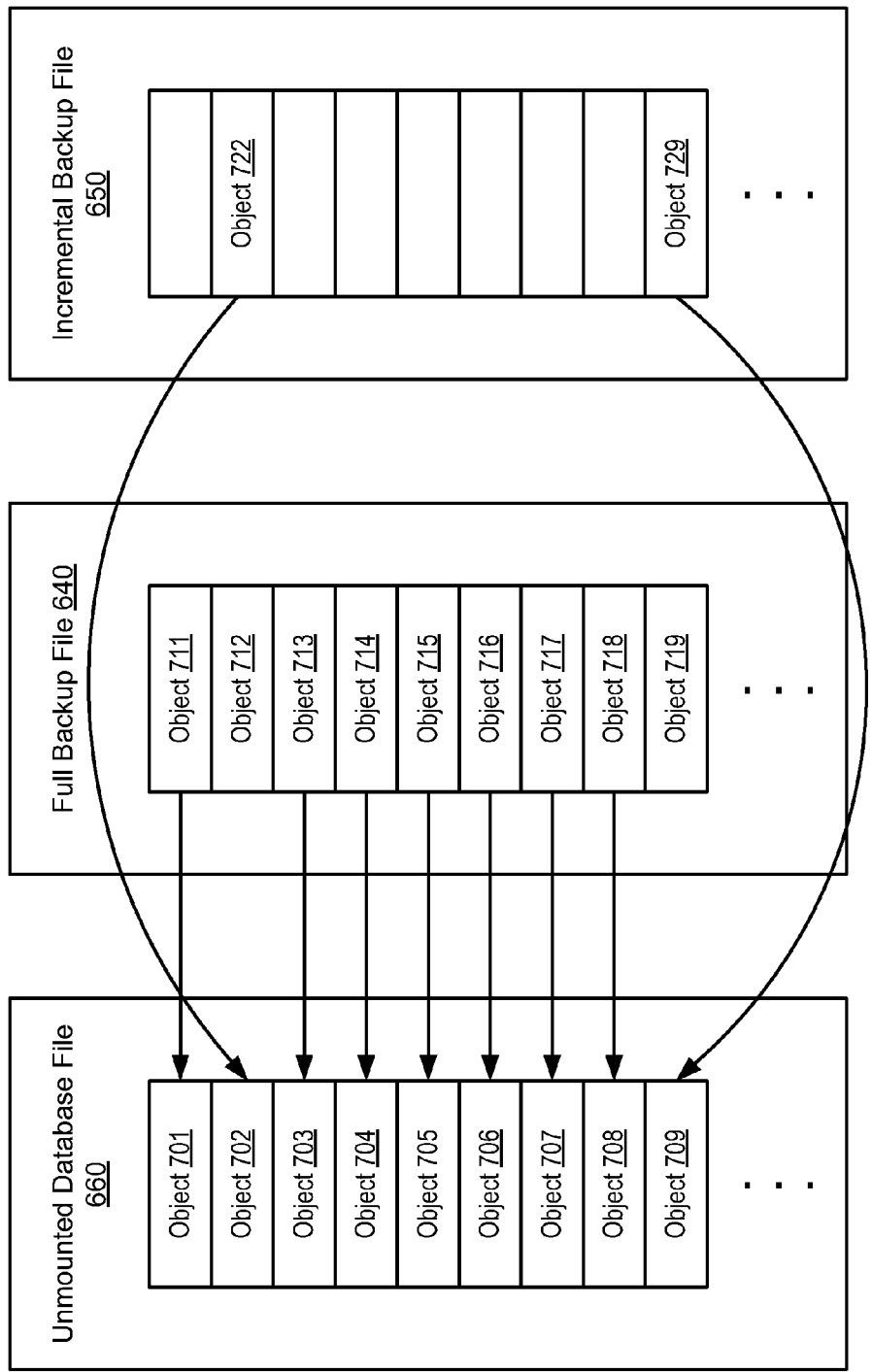
FIG. 7 illustrates one embodiment of an unmounted database file reconstructed from a full backup file and an incremental backup file.

Referring now to FIG. 7, a block diagram of one embodiment of an unmounted database file reconstructed from a full backup file and an incremental backup file is shown. Unmounted database file 660, full backup file 640, and incremental backup file 650 correspond to the same files of FIG. 6. Full backup file 640 includes objects 711-719 that are representative of any number of stored database objects. Objects 711-719 may be representative of any type of data stored in a database, including tables, records, documents, items, lists, and other data. Incremental backup file 650 includes objects 722 and 729 which may be representative of any number of objects that have changed in between the time when full backup file 640 was created and the time when incremental backup file 650 was created. Objects 722 and 729 correspond to changed extents that were collected in the incremental backup operation that created incremental backup file 650. Also, the objects displayed in full backup file 640 and incremental backup file 650 may include metadata describing the objects.

FIG. 7 depicts one embodiment of a restore operation. A restore application may write objects 711 and 713-719 from full backup file 640 to unmounted database file 660 as objects 701 and 703-708, respectively. Then, the restore application may write objects 722 and 729 from incremental backup file 650 to unmounted database file 660 as objects 702 and 709. The restore application may use one or more allocation maps and/or other metadata stored with incremental backup file 650 to determine the appropriate location for writing objects 722 and 729 to unmounted database file 660. Objects 712 and 719 may be overwritten by objects 722 and 729, respectively. After objects 722 and 729 have been written from incremental backup file 650 to unmounted database file 660, the restore application may notify the SQL server that unmounted database file 660 has been reconstructed and is ready to be restored to the live copy of the database. The restore application may run on a database server, media server, or other computing device.

In another embodiment, the restore application may use full backup file 640 as the starting point for the restore application. The restore application may write the objects from incremental backup file 650 (and any additional incremental backup files corresponding to further incremental backup operations that were performed) to full backup file 640, with the changed objects overwriting the original objects. In a further embodiment, the restore application may write full backup file 640 and incremental backup file 650 back on top of the working copy of the database or to another copy of the database. In a still further embodiment, objects may be buffered in memory before being restored to the working copy of the database. In a still further embodiment, objects may be restored from full backup file 640 and differential backup file 650 to a file system on a storage medium, SQL server, media server, other server, or other computing device. In a still further embodiment, objects may be restored to an internal portal application or other software application.

The illustrations of unmounted database file 660, full backup file 640, and incremental backup file 650 in FIG. 7 are logical representations of these files. The actual structure and organization of these files may be different from how they appear in FIG. 7. For example, additional data may be appended to incremental backup file 650. If new objects are added to the database after full backup file 640 is created, metadata describing the new objects may be added to the end of incremental backup file 650. Also, if objects are deleted from the database after full backup file 640 is created, metadata describing the deleted objects may be appended to incremental backup file 650. The restore application may use the metadata to determine which objects to add and which objects to delete from unmounted database file 660.

The restore application may generate a plurality of unmounted database files corresponding to different point-in-time instances of the database. The restore application may generate a user interface for a user to access and select from the plurality of point-in-time database instances. The user may wish to restore one or more objects from a backup copy of the database from a specific point-in-time. Alternatively, the user may wish to restore the entire database from a specific point-in-time. The user interface presented by the restore application may display a plurality of backups for the user to select from when considering a restore operation. The point-in-time backups may be listed according to the date or time on which the backups were performed. Other methods of listing and organizing the point-in-time backups are possible and contemplated.

Figure 8:
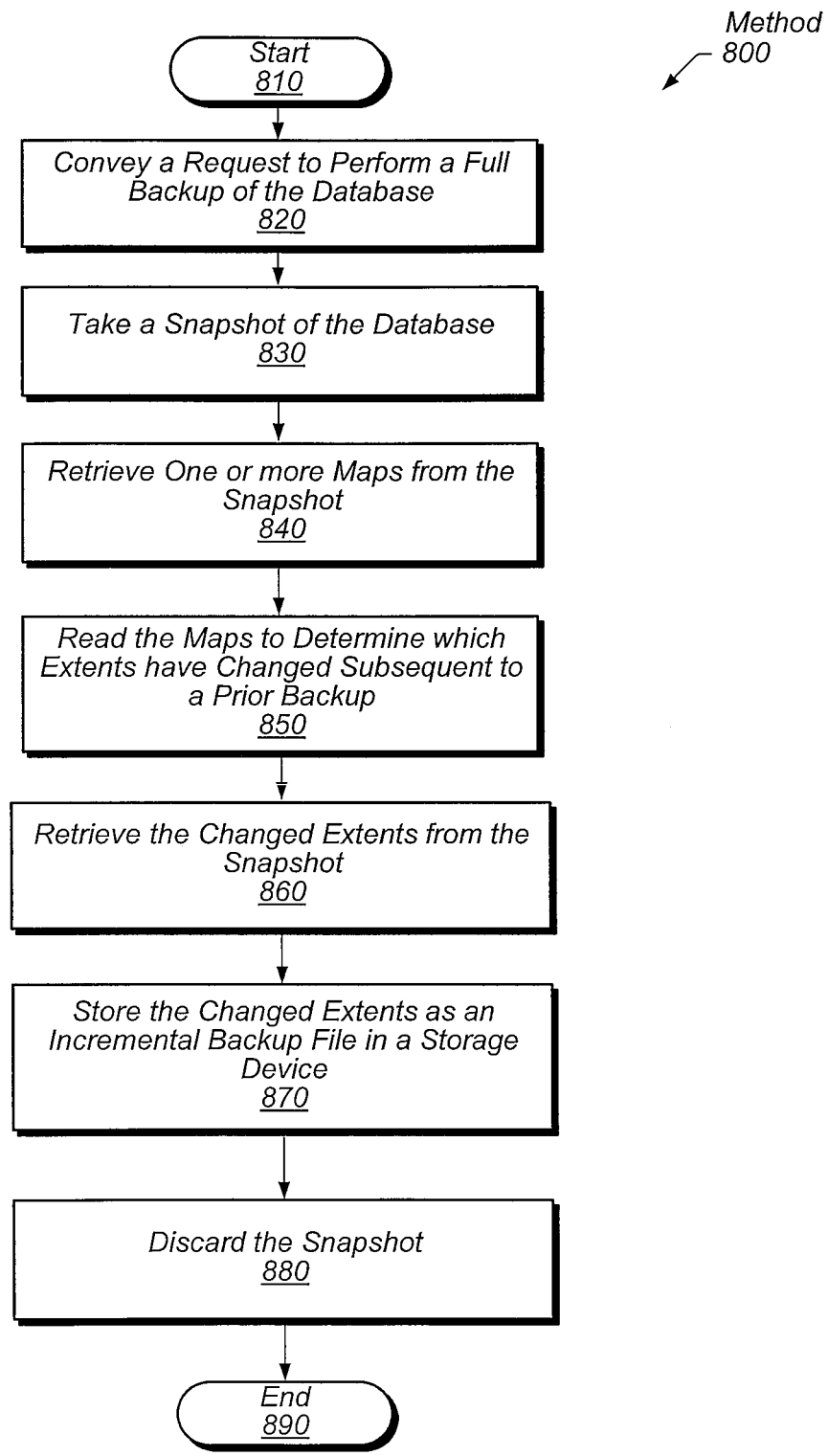
FIG. 8 is a generalized flow diagram illustrating one embodiment of an incremental backup operation.

Referring now to FIG. 8, one embodiment of a method for performing an incremental backup of a database is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The method 800 starts in block 810, and then a request to perform a full backup of the database may be conveyed in block 820. The request may be made by a user or administrator and conveyed to a database server. Alternatively, the request may be made automatically by a database server, media server, or other computing device in accordance with a prearranged backup schedule. The database server may behave as though a full database backup is being performed even though only an incremental backup file may actually be performed. Next, a snapshot of the database may be taken in block 830. The snapshot may be performed by a database server. At some point after the snapshot of the database is taken, the database server may reset the live copy of the DCM bitmap as though a full backup operation were performed. Resetting the live copy of the DCM bitmap will clear all of the changed data/extent indicators from the bitmap and allow the database server to track only changes that occur after the snapshot has been taken.

After block 830, one or more maps may be retrieved from the snapshot (block 840). The maps may include a DCM, GAM, SGAM, IAM, and/or other maps. The maps may be read to determine which extents have changed subsequent to a prior backup (block 850). The maps may also be used to determine if the changed extents are allocated. The prior backup may have been a full backup, snapshot backup, or incremental backup.

After block 850, the changed extents may be retrieved from the snapshot (block 860). The one or more maps may be used to locate the changed extents within the snapshot. In one embodiment, only the changed extents that are allocated to objects may be retrieved. Next, the changed extents may be stored as an incremental backup file in a storage device (block 870). Also, the one or more maps and any additional metadata may also be stored in a storage device. Then, the snapshot may be discarded in block 880. After block 880, method 800 may end in block 890.

Figure 9:
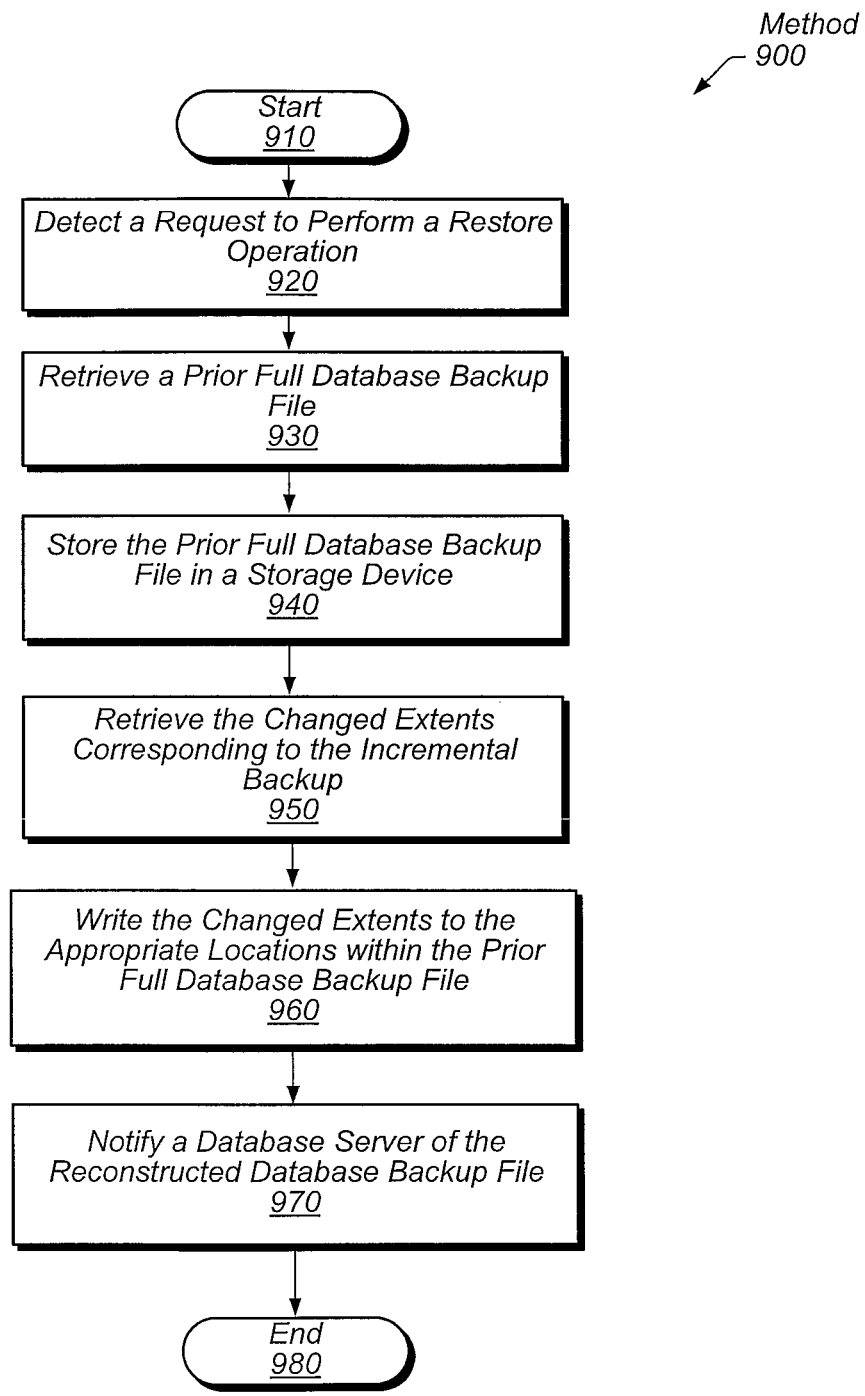
FIG. 9 is a generalized flow diagram illustrating one embodiment of a restore operation following from an incremental backup.

Turning now to FIG. 9, one embodiment of a method for performing a restore operation from an incremental backup is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The method 900 starts in block 910, and then a request to perform a restore operation from a backup version of the database may be detected in block 920. The restore operation may be requested by a user or administrator, and the restore operation may be requested based on a specific point-in-time of the database corresponding to a prior backup operation. The prior backup operation may have been a full, incremental, differential, or log backup of the database. Next, a prior full database backup file may be retrieved in block 930. The prior full database backup file may correspond to the most recent full backup operation of the database at or prior to the specific point-in-time requested by the user. Then, the prior full database backup file may be stored in a storage device (block 940). In one embodiment, the storage device may be a separate storage device from the backup storage device containing the full database backup file. In another embodiment, the storage device may be the same as the backup storage device containing the full database backup file. In a further embodiment, the storage device may be one or more storage devices attached to the database server associated with the live instance of the database.

After block 940, the changed extents corresponding to an incremental backup operation may be retrieved from a backup storage device (block 950). Also, one or more stored maps associated with the incremental backup operation may also be retrieved from the backup storage device. The one or more stored maps may include the DCM, GAM, SGAM, IAM, and/or other maps. Additional metadata associated with the changed extents may also be retrieved from the backup storage device. Next, the changed extents may be written to the appropriate locations within the prior full database backup file (block 960). The one or more maps may be used to determine the appropriate locations within the prior full database backup file. Then, the database server may be notified of the reconstructed database backup file (block 970). The database server may be notified that the reconstructed database file is ready to be restored. The database server may restore the entire reconstructed file, or the database server may restore one or more objects from the reconstructed file. After block 970, method 900 may end in block 980.

It is noted that the above-described embodiments may comprise software. In such an embodiment, program instructions and/or a database (both of which may be referred to as "instructions") that represent the described systems and/or methods may be stored on a computer readable storage medium. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A method for performing an incremental backup of a database, the method comprising:
    initiating the incremental backup by conveying a request to a database server to perform a full backup of the database;
    in response to said request to perform the full backup:
        retrieving one or more maps associated with the database, said one or more maps including an identification of data which has changed since a prior backup, wherein the one or more maps include a differential change map (DCM) comprising a bitmap which indicates all data that has changed since the prior backup;
        resetting the DCM associated with the database as if a full backup were performed in response to said request such that the DCM indicates no changes have occurred since a most recent full backup;
        retrieving the changed data;
        storing the changed data as an incremental backup file in a storage device; and storing said one or more maps in association with the incremental backup file;

wherein a schema of the database is automatically generated by querying the database when the prior backup is performed.

2. The method as recited in claim 1, further comprising taking a snapshot of the database, in response to the request to perform the full backup.

3. The method as recited in claim 1, wherein the one or more maps include a global allocation map (GAM) comprising information about data extents that have been allocated, a shared global allocation map (SGAM) comprising information about mixed extents that have at least one unused page, and/or an index allocation map (IAM) comprising information about extents that a table or index uses, and wherein prior to retrieving the changed data, the method further comprising:

reading the one or more maps to determine if the changed extents are allocated; and retrieving the changed extents only if they are allocated.

4. The method as recited in claim 1, further comprising:

detecting a request corresponding to said incremental backup file to perform a restore operation;

identifying a full database backup file associated with the incremental backup file;

creating a restored database by performing a restore operation using the incremental backup file and the full database backup file associated with the incremental backup file; and notifying a database server of the restored database.

5. The method as recited in claim 1, further comprising:

identifying a previously stored full backup;

retrieving a map associated with the previously stored full backup;

utilizing said map to identify particular data which has changed since a backup performed prior to the previously stored full backup;

storing the particular data as part of a compressed version of the previously stored full backup; and discarding data of the previously stored full backup which has not changed since the backup performed prior to the previously stored full backup.

6. A computer readable storage medium comprising program instructions to perform an incremental backup of a database, wherein when executed the program instructions are configured to:

initiate the incremental backup by conveying a request to perform a full backup of the database;

in response to said request to perform the full backup:

retrieve one or more maps associated with the database, said one or more maps including an identification of data which has changed since a prior backup, wherein the one or more maps include a differential change map (DCM) comprising a bitmap which indicates all data that has changed since the prior backup;

reset the DCM associated with the database as if a full backup were performed in response to said request such that the DCM indicates no changes have occurred since a most recent full backup;

retrieve the changed data;

store the changed data as an incremental backup file in a storage device; and store said one or more maps in association with the incremental backup file;

wherein a schema of the database is automatically generated by querying the database when the prior backup is performed.

7. The computer readable storage medium as recited in claim 6, wherein the program instructions are further configured to take a snapshot of the database, in response to the request to perform the full backup.

8. The computer readable storage medium as recited in claim 6, wherein the one or more maps include a global allocation map (GAM) comprising information about data extents that have been allocated, a shared global allocation map (SGAM) comprising information about mixed extents that have at least one unused page, and/or an index allocation map (IAM) comprising information about extents that a table or index uses, and wherein prior to retrieving the changed data, the instructions are configured to:

read the one or more maps to determine if the changed extents are allocated; and retrieve the changed extents only if they are allocated.

9. The computer readable storage medium as recited in claim 6, wherein the program instructions are further configured to:

detect a request corresponding to said incremental backup file to perform a restore operation;

identify a full database backup file associated with the incremental backup file;

create a restored database by performing a restore operation using the incremental backup file and the full database backup file associated with the incremental backup file; and notify a database server of the restored database.

10. The computer readable storage medium as recited in claim 9, wherein the program instructions are further configured to:

identify a previously stored full backup;

retrieve a map associated with the previously stored full backup;

utilize said map to identify particular data which has changed since a backup performed prior to the previously stored full backup;

store the particular data as part of a compressed version of the previously stored full backup; and discard data of the previously stored full backup which has not changed since the backup performed prior to the previously stored full backup.

11. A system for performing an incremental backup of a database, the system comprising:

a database server;

a media server;

a database; and one or more storage devices;

wherein in response to a request to perform a full backup, the database server is configured to:

initiate the incremental backup using a request to initiate a full backup; and wherein the media server is configured to:

retrieve one or more maps associated with the database, said one or more maps including an identification of data which has changed since a prior backup, wherein the one or more maps include a differential change map (DCM) comprising a bitmap which indicates all data that has changed since the prior backup;

reset the DCM associated with the database as if a full backup were performed in response to said request such that the DCM indicates no changes have occurred since a most recent full backup;

retrieve the changed data;

store the changed data as an incremental backup file in a storage device; and store said one or more maps in association with the incremental backup file;

wherein a schema of the database is automatically generated by querying the database when the prior backup is performed.

12. The system as recited in claim 11, wherein the system is configured to take a snapshot of the database, in response to the request to perform the full backup.

13. The system as recited in claim 11, wherein the one or more maps include a global allocation map (GAM) comprising information about data extents that have been allocated, a shared global allocation map (SGAM) comprising information about mixed extents that have at least one unused page, and/or an index allocation map (IAM) comprising information about extents that a table or index uses, and wherein prior to retrieving the changed data, the system is configured to:

read the one or more maps to determine if the changed extents are allocated; and retrieve the changed extents only if they are allocated.

14. The system as recited in claim 11, wherein the media server is further configured to:

detect a request corresponding to said incremental backup file to perform a restore operation;

identify a full database backup file associated with the incremental backup file;

create a restored database by performing a restore operation using the incremental backup file and the full database backup file associated with the incremental backup file; and notify a database server of the restored database.

\* \* \* \* \*